Feb. 5, 1952    R. J. CARBARY    2,584,670
DRIP TRAY ASSEMBLY
Filed April 11, 1950
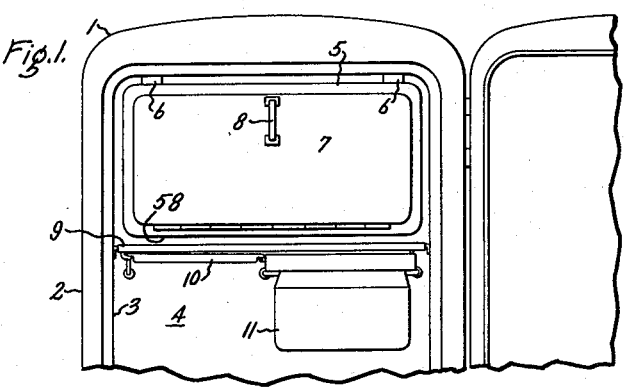
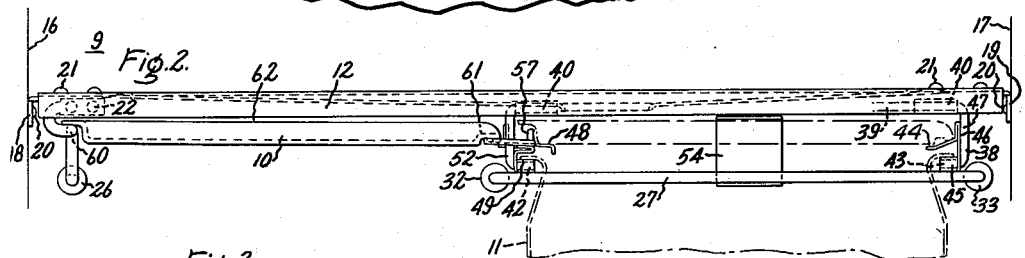
Inventor:
Richard J. Carbary,
by William G. Edwards, Jr.
His Attorney, Patented Feb. 5, 1952

2,584,670

UNITED STATES PATENT OFFICE 2,584,670

DRIP TRAY ASSEMBLY

Richard J. Carbary, Erie, Pa., assignor to General Electric Company, a corporation of New York Application April 11, 1950, Serial No. 155,291

6 Claims. (Cl. 62—103)

My invention relates to refrigerators and more particularly to drip catching arrangements therefor.

In some refrigerators, a so-called horizontal evaporator is employed, that is, an evaporator extending substantially the full width of the food storage compartment at the top portion thereof. Normally it is desirable to leave at least some portion of the surface of the evaporator exposed to the circulation of air for cooling the air within the food storage compartment. However, it is desirable to provide a selective arrangement wherein drip catching elements are positioned below the entire evaporator so that drip water falling from the evaporator, for example during the defrosting operation, is not allowed to fall onto the food stored in the compartment.

Accordingly, it is an object of my invention to provide a refrigerator having a horizontal evaporator and including an improved arrangement for collecting drip from the evaporator door and for collecting defrost water from the evaporator.

It is another object of my invention to provide a refrigerator having a horizontal evaporator and including an improved arrangement for mounting a drip collecting element in one position for normal operation and in a second position for defrosting operation.

It is a further object of my invention to provide a drip tray assembly including a drip tray and a meat pan and including an improved arrangement for directing drip water into the meat pan during the defrosting operation only.

Further objects and advantages of my invention will be apparent as the following description proceeds, and the features of novelty which characterize my invention will be pointed out with particularity in the claims annexed to and forming part of this specification.

In carrying out the objects of my invention, a frame is mounted beneath a horizontal evaporator and includes a cross piece for collecting drip from the door of the evaporator and members extending rearwardly from the cross piece for supporting a drip tray and a meat pan or receptacle. The rearwardly extending members are arranged so that the drip tray may be mounted in a position above the meat pan or in a second position to one side of the meat pan. These members are further arranged so that in the first position the drip tray is maintained generally horizontal while in the second position it is inclined to direct drip water into the meat pan.

For a better understanding of my invention, reference may be had to the accompanying drawing in which Fig. 1 is an elevation view of a portion of the refrigerator illustrating an embodiment of my invention; Fig. 2 is an enlarged view of a portion of Fig. 1, showing details of construction; Fig. 3 is a plan view, partly broken away, of the frame assembly; and Fig. 4 is a veiw taken along the lines 4—4 in Fig. 3.

Referring to the drawing, there is shown a refrigerator 1 including an outer wall 2 and an inner liner 3 which defines a food storage compartment 4. An evaporator 5 is secured by brackets 6 to the top portion of the liner 3 and extends substantially the full width of the food storage compartment 4. The front of the evaporator is closed by an evaporator door 7 having a handle 8. Beneath the evaporator, there is positioned a drip tray assembly or frame 9 which slidably supports a drip tray 10 and a meat pan or receptacle 11.

In Figs. 2, 3 and 4, details of the drip tray assembly or frame 9 are shown. The frame 9 includes a cross piece 12 which extends substantially the full width of the food storage compartment 4 and is positioned below the evaporator door 7 so as to collect drip water resulting from condensation on the evaporator door. The frame further includes a central member 13 extending rearwardly from the cross piece 12 and two rearwardly extending side members 14 and 15 which are disposed adjacent opposite side walls 16 and 17, respectively, of the liner 3. The cross piece 12 and hence the forward portion of the frame 9 are supported on the side walls 16 and 17 by brackets 18 and 19, respectively, which are secured to the side walls by screws 20, or other suitable fastening devices. The cross piece 12 is secured to the brackets 18 and 19 by screws 21 or other suitable fastening devices. The side member 14 is secured at its forward end to the cross piece 12 by screws 22. The rear end 23 of the side member 14 extends through an opening 24 in the rear wall 25 of the liner 3, a rubber grommet 26 being placed between the end 23 of the side member 14 and the edge of the opening 24. The frame further includes a U-shaped rod 27 having rearwardly extending legs 28 and 29 which project through openings 30 and 31, respectively, in the rear wall 25. Rubber grommets 32 and 33 are placed on the legs 28 and 29, respectively, and engage the rear wall 25 of the liner adjacent the openings 30 and 31, respectively. The rear end 34 of the central member 13 is supported on and secured to the rod 27 and the rear end 35 of the side member 15 is similarly supported by and secured to the rod 27.

The front portions 36 and 37 of the members 13 and 15 are supported from the cross piece 12. The connection between the cross piece 12 and the members 13 and 15 is provided by a generally C-shaped rod element 38. The upper horizontal portion 39 of the element 38 is received within loops 40 secured to or formed integral with a rear flange portion 41 of the cross piece 12. The inwardly extending lower horizontal portion 42 of the element 38 extends beneath the central member 13 and the member 13 is secured thereto in any suitable manner, as by welding. Similarly, the inwardly extending lower horizontal portion 43 of the element 38 extends beneath the forward portion 37 of the side member 15, and the side member 15 is secured thereto.

The side member 15 is shaped to provide an upper slide 44 for supporting the drip tray 10 and a lower slide 45 for supporting the meat pan or receptacle 11. A vertical section 46 is secured to a vertical leg 47 of the element 38 by welding, or any other suitable manner. Similarly, the central member 13 includes an upper slide 48 for supporting the drip tray and a lower slide 49 for supporting the receptacle 11. The slide 48 is part of the upper surface 50 of the central member 13, and, as indicated, this surface 50 is inclined slightly to the right in the direction of the receptacle 11. A recess or notch 51 is provided in the surface 50 of the member 13 for receiving the vertical leg 52 of the element 38.

As illustrated in Fig. 2, the receptacle 11 is slidably supported on the frame 9 by slides 45 and 49. During normal operation, the drip tray 10 is slidably supported on the slides 44 and 48 of the members 15 and 13, respectively, as indicated by the dashed lines in Fig. 2. Both the drip tray 10 and the receptacle 11 extend forwardly to a point substantially even with the front edge 53 of the cross piece 12. A stop 54 is secured to the rod 27 to properly position the drip tray and receptacle 11. An opening 55 is provided in the cross piece 12 in a position above the normal locations of the drip tray and the receptacle 11. The upper surface 56 of the cross piece 12 is sloped toward the opening 55 to direct water dripping onto the cross piece 12 from the door 7 into and through the opening 55. The drip tray 10 is relatively shallow, but the amount of water directed through the opening 55 during normal operation is relatively small so that the capacity of the drip tray is adequate for receiving all of this water. The drip tray being positioned directly above the receptacle 11 and being substantially horizontal in its normal position as indicated by the dashed lines in Fig. 2, the water passing through the opening 55 is all received by the drip tray and is not permitted to fall into the receptacle 11 where it might possibly cause damage to meat and similar foods stored therein. A guide 57 is secured to the central member 13 and acts to guide the tray 10 during sliding movement in the normal position of the tray as indicated by the dashed lines in Fig. 2.

When the tray 10 occupies the normal position described above, it will be apparent that a substantial portion of the undersurface of the evaporator at the left-hand portion thereof is exposed to air circulating within the food storage compartment 4. Occasionally it is necessary to defrost the evaporator, and under such circumstances it is desirable to position beneath the left-hand portion 58 of the evaporator some element for collecting water and ice falling from this portion of the evaporator. By my arrangement, the drip tray 10 may readily be shifted from the normal position to a defrosting position, as indicated by the solid lines in Fig. 2, wherein the drip tray is selectively positioned beneath the left-hand portion 58 of the evaporator. In this position, any defrost water from the left-hand portion of the evaporator is received by the drip tray 10 and is prevented from falling onto the food stored in the food storage compartment 4. In the defrosting position of the drip tray, the left-hand side of the drip tray is supported by the side member 14 and the right-hand side of the drip tray is supported by the central member 13. A second guide 59 is secured to the upper surface of the central member 13 and guides the drip tray 10 for sliding movement in this defrosting position. The tray-supporting portion of the central member 13 is positioned lower than the tray-supporting portion 60 of the side member 14 so that, in the defrosting position, the tray is inclined to the right in the direction of the central member 13. Further, the surface 50 of the central member 13 is, as explained above, also inclined slightly to the right. Therefore, as water is collected in the drip tray 10, it tends to overflow at the edge 61 onto the inclined surface 50 of the central member 13 from which surface it is directed into the receptacle 11. As shown, the edge 61 is located below the top 62 of the front and back walls of the drip tray, thereby providing a mouth for water overflowing from the drip tray. Any articles normally kept in the receptacle 11 are removed preliminary to the defrosting operation. The relatively shallow drip tray 10, of course, does not have sufficient capacity for holding all of the defrost water which might be collected from the left-hand portion 58 of the evaporator, but, by the arrangement described above, the drip tray continually empties into the much larger receptacle 11, which does have the capacity adequate to hold all of the defrost water which might drip from the evaporator from the defrosting operation. Thus, I have provided a drip tray assembly or frame wherein a drip tray is normally positioned so as to receive the small amount of water resulting from condensation during normal usage and to prevent this water from dripping into the meat pan or receptacle 11. Further, during the defrosting operation, the relatively shallow drip tray is so positioned that water collecting therein is directed into the relatively larger and deeper receptacle 11. Moreover, the frame includes a cross piece extending beneath the door 7, which is the source of substantially all of the condensed moisture during normal operation, and thereby prevents this moisture from falling down onto foods stored within the food storage compartment 4.

While I have shown and described a specific embodiment of my invention, I do not desire my invention to be limited to the particular construction shown and described and I intend by the appended claims to cover all modifications within the spirit and scope of my invention.

What I claim is new and desire to secure by Letters Patent of the United States is:

1. In a refrigerator having a food storage compartment and an evaporator disposed at the top portion of the food storage compartment and extending substantially the full width of the storage compartment, a door for closing the front of the evaporator, a horizontal supporting frame disposed beneath said evaporator, said frame including a horizontally extending cross piece beneath said door for collecting drip therefrom, said frame further including a central rearwardly extending member and two rearwardly extending side members disposed adjacent opposite side walls of said compartment, a drip tray supported by said frame, a receptacle supported by said frame, said central member and one of said side members including means for supporting said drip tray in one position beneath said evaporator during normal operation and further including means for supporting said receptacle beneath said drip tray, said central member and the other of said side members including means for supporting said drip tray in a second position beneath said evaporator laterally removed from said first position and disposed laterally from said receptacle during defrosting, said cross piece having an opening therein and being sloped toward said opening to direct drip water therethrough, said drip tray being disposed beneath said opening for receiving water from said opening when said drip tray is in said first position, said receptacle being disposed beneath said opening and receiving water from said opening when said drip tray is in said second position.

2. In a refrigerator having a food storage compartment and an evaporator disposed at the top portion of the storage compartment and extending substantially the full width of the storage compartment, a door for closing the front of the evaporator, a horizontal supporting frame disposed beneath said evaporator, said frame including a horizontally extending cross piece beneath said door for collecting drip therefrom, said frame further including a central rearwardly extending member and two rearwardly extending side members disposed adjacent opposite side walls of said compartment, a drip tray supported by said frame, a receptacle supported by said frame, said central member and one of said side members including means for supporting said drip tray in one position beneath said evaporator during normal operation and further including means for supporting said receptacle beneath said drip tray, said central member and the other of said side members including means for supporting said drip tray in a second position beneath said evaporator laterally removed from said first position and disposed laterally from said receptacle during defrosting, said central member being laterally inclined to direct drip water from said drip tray into said receptacle when said drip tray is in said second position, said cross piece having an opening therein and being sloped toward said opening to direct drip water therethrough, said drip tray being disposed beneath said opening for receiving water from said opening when said drip tray is in said first position, said receptacle being disposed beneath said opening and receiving water from said opening when said drip tray is in said second position.

3. In a refrigerator having a food storage compartment and an evaporator disposed at the top portion of the storage compartment and extending substantially the full width of the storage compartment, a door for closing the front of the evaporator, a horizontal supporting frame disposed beneath said evaporator, said frame including a horizontally extending cross piece beneath said door for collecting drip therefrom, said frame further including a central rearwardly extending member and two rearwardly extending side members disposed adjacent opposite side walls of said compartment, a drip tray slidably supported by said frame, a receptacle slidably supported by said frame, said central member and one of said side members including means for slidably supporting said drip tray in one position beneath said evaporator during normal operation and further including means for slidably supporting said receptacle beneath said drip tray, said central member and the other of said side members including means for supporting said drip tray in a second position beneath said evaporator laterally removed from said first position and disposed laterally from said receptacle during defrosting, said central member being laterally inclined to direct drip water from said drip tray into said receptacle when said drip tray is in said second position, said central member having two parallel guides secured thereto, one of said guides guiding said drip tray during sliding movement in said first position, the other of said guides guiding said drip tray during sliding movement in said second position.

4. In a refrigerator including a liner having a rear wall and two side walls defining a food storage compartment and an evaporator disposed at the top portion of the storage compartment and extending substantially the full width of the storage compartment, a door for closing the front of the evaporator, a horizontal supporting frame disposed beneath said evaporator, means for mounting said frame on said side walls and said rear wall of the liner, said frame including a horizontally extending cross piece beneath said door for collecting drip therefrom, said cross piece being secured to said side walls, said frame further including a central rearwardly extending member and two rearwardly extending side members disposed adjacent opposite side walls of said compartment, a drip tray supported by said frame, a receptacle supported by said frame, said central member and one of said side members including means for supporting said drip tray in one position beneath said evaporator during normal operation and further including means for supporting said receptacle beneath said drip tray, said central member and the other of said side members including means for supporting said drip tray in a second position beneath said evaporator laterally removed from said first position and disposed laterally from said receptacle during defrosting, said central member being laterally inclined to direct drip water from said drip tray into said receptacle when said drip tray is in said second position, said cross piece having an opening therein and being sloped toward said opening to direct drip water therethrough, said drip tray being disposed beneath said opening for receiving water from said opening when said drip tray is in said first position, said receptacle being disposed beneath said opening and receiving water from said opening when said drip tray is in said second position.

5. In a refrigerator having a food storage compartment and an evaporator disposed at the top portion of the storage compartment and extending substantially the full width of the storage compartment, a door for closing the front of the evaporator, a horizontal supporting frame disposed beneath said evaporator, said frame including a horizontally extending cross piece beneath said door for collecting drip therefrom, said frame further including a central rearwardly extending member and two rearwardly extending side members disposed adjacent opposite side walls of said compartment, a drip tray supported by said frame, a receptacle supported by said frame, said central member and one of said side members including means for supporting said drip tray in one position beneath said evaporator during normal operation and further including means for supporting said receptacle beneath said drip tray, said central member and the other of said side members including means for supporting said drip tray in a second position beneath said evaporator laterally removed from said first position and disposed laterally from said receptacle during defrosting, said central member being so disposed relative to said other of said side members that said drip tray is supported by said central member and said other of said side members in a position inclined toward said central member in said second position of said drip tray whereby water collecting in said drip tray overflows from said drip tray onto said central member, said central member being laterally inclined to direct drip water from said drip tray into said receptacle when said drip tray is in said second position.

6. In a refrigerator having a food storage compartment and an evaporator disposed at the top portion of the food storage compartment and extending substantially the full width of the storage compartment, a door for closing the front of the evaporator, a horizontal supporting frame disposed beneath said evaporator, said frame including a horizontally extending cross piece beneath said door for collecting drip water therefrom, said frame further including a central rearwardly extending member and two rearwardly extending side members disposed adjacent opposite side walls of said compartment, a drip tray supported by said frame, a receptacle supported by said frame, said central member and one of said side members including means for supporting said drip tray in one position beneath said evaporator during normal operation and further including means for supporting said receptacle beneath said drip tray, said central member and the other of said side members including means for supporting said drip tray in a second position beneath said evaporator laterally removed from said first position and disposed laterally from said receptacle during defrosting, said central member and said one of said side members being arranged to support said drip tray horizontally in said first position, said central member and said other of said side members being arranged to support said drip tray inclined toward said central member in said second position.

RICHARD J. CARBARY.

REFERENCES CITED

The following references are of record in the file of this patent:

UNITED STATES PATENTS

| Number | Name | Date |
| --- | --- | --- |
| 2,281,690 | Hedlund | May 5, 1942 |
| 2,327,672 | Schweller | Aug. 24, 1943 |
| 2,450,305 | Shoemaker | Sept. 28, 1948 |